(12) United States Patent
Sistla et al.

(10) Patent No.: US 7,360,008 B2
(45) Date of Patent: Apr. 15, 2008

(54) ENFORCING GLOBAL ORDERING THROUGH A CACHING BRIDGE IN A MULTICORE MULTIPROCESSOR SYSTEM

(75) Inventors: Krishnakanth V. Sistla, Hillsboro, OR (US); Yen-Cheng Liu, Portland, OR (US); Zhong-Ning Cai, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 11/026,676

(22) Filed: Dec. 30, 2004

(65) Prior Publication Data

US 2006/0149885 A1    Jul. 6, 2006

(51) Int. Cl.
    *G06F 13/36* (2006.01)
(52) U.S. Cl. .............. 710/310; 710/309; 711/118; 712/32
(58) Field of Classification Search .......... 710/3, 710/107, 309, 310; 711/140, 141, 145, 146, 711/136, 137, 158, 203, 120, 202; 370/394; 702/188; 708/620; 326/38; 718/1
    See application file for complete search history.

(56) References Cited

U.S. PATENT DOCUMENTS

| | | | | |
|---|---|---|---|---|
| 5,736,867 A * | 4/1998 | Keiser et al. | ............... | 326/38 |
| 5,796,977 A * | 8/1998 | Sarangdhar et al. | ........... | 718/1 |
| 5,835,739 A * | 11/1998 | Bell et al. | ................... | 710/309 |
| 5,893,151 A * | 4/1999 | Merchant | ................... | 711/140 |
| 5,923,857 A * | 7/1999 | Pawlowski et al. | ......... | 710/107 |
| 6,112,283 A * | 8/2000 | Neiger et al. | ............... | 711/146 |
| 6,275,906 B1 * | 8/2001 | Nunez et al. | ............... | 711/141 |
| 6,341,334 B1 * | 1/2002 | Kamemaru | ................ | 711/137 |
| 6,473,837 B1 * | 10/2002 | Hughes et al. | .............. | 711/146 |
| 6,618,799 B2 * | 9/2003 | Hagersten | ................... | 711/202 |
| 6,848,032 B2 * | 1/2005 | Benkual et al. | ............. | 711/146 |
| 6,934,814 B2 * | 8/2005 | Glasco et al. | ............... | 711/141 |
| 6,959,316 B2 * | 10/2005 | Parviainen | .................. | 708/620 |
| 6,973,528 B2 * | 12/2005 | Bronson et al. | ........... | 710/310 |
| 6,976,131 B2 * | 12/2005 | Pentkovski et al. | ......... | 711/146 |
| 7,020,748 B2 * | 3/2006 | Caprioli | ...................... | 711/136 |
| 7,043,405 B2 * | 5/2006 | Orenstien et al. | .......... | 702/188 |
| 7,076,609 B2 * | 7/2006 | Garg et al. | ............. | 711/120 |
| 2003/0097539 A1 * | 5/2003 | Hagersten | ................... | 711/203 |
| 2003/0145136 A1 * | 7/2003 | Tierney et al. | ................. | 710/3 |
| 2003/0163649 A1 * | 8/2003 | Kapur et al. | ................ | 711/146 |
| 2003/0177320 A1 * | 9/2003 | Sah et al. | .................... | 711/158 |
| 2005/0041666 A1 * | 2/2005 | Hass | ......................... | 370/394 |
| 2006/0143408 A1 * | 6/2006 | Sistla | .......................... | 711/145 |

* cited by examiner

*Primary Examiner*—Christopher E. Lee
(74) *Attorney, Agent, or Firm*—David P. McAbee

(57) ABSTRACT

The present invention presents an efficient way to implement global ordering between a system interconnect and internal core interfaces in a MCMP system. In particular, snooping transactions on the system interconnect, processor requests, and processor request completions may trigger corresponding snooping transactions and request completions to the cores. The order in which the transactions are observed on the system interconnect may impose the order in which the transaction triggered to the core are generated. Since this ordering is between multiple interfaces this is referred to as global ordering.

25 Claims, 7 Drawing Sheets

ENFORCING GLOBAL ORDERING THROUGH A CACHING BRIDGE IN A MULTICORE MULTIPROCESSOR SYSTEM

BACKGROUND INFORMATION

Current multi-core processors contain multiple compute cores which are connected to an on-die shared cache through a caching bridge. Multi-processor systems which are constructed with multi-core processors maybe referred to as multi-core multiprocessor (MCMP) systems. MCMP systems are becoming increasingly popular in commercial server systems because of their improved scalability and modular design.

Enforcing ordering of transactions between a system interconnect and an internal core interface is a critical requirement to preserve program order behavior in MCMP systems. Thus, a need exists for efficiently implementing global ordering between the system interconnect and the internal core interfaces.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Figure 1:
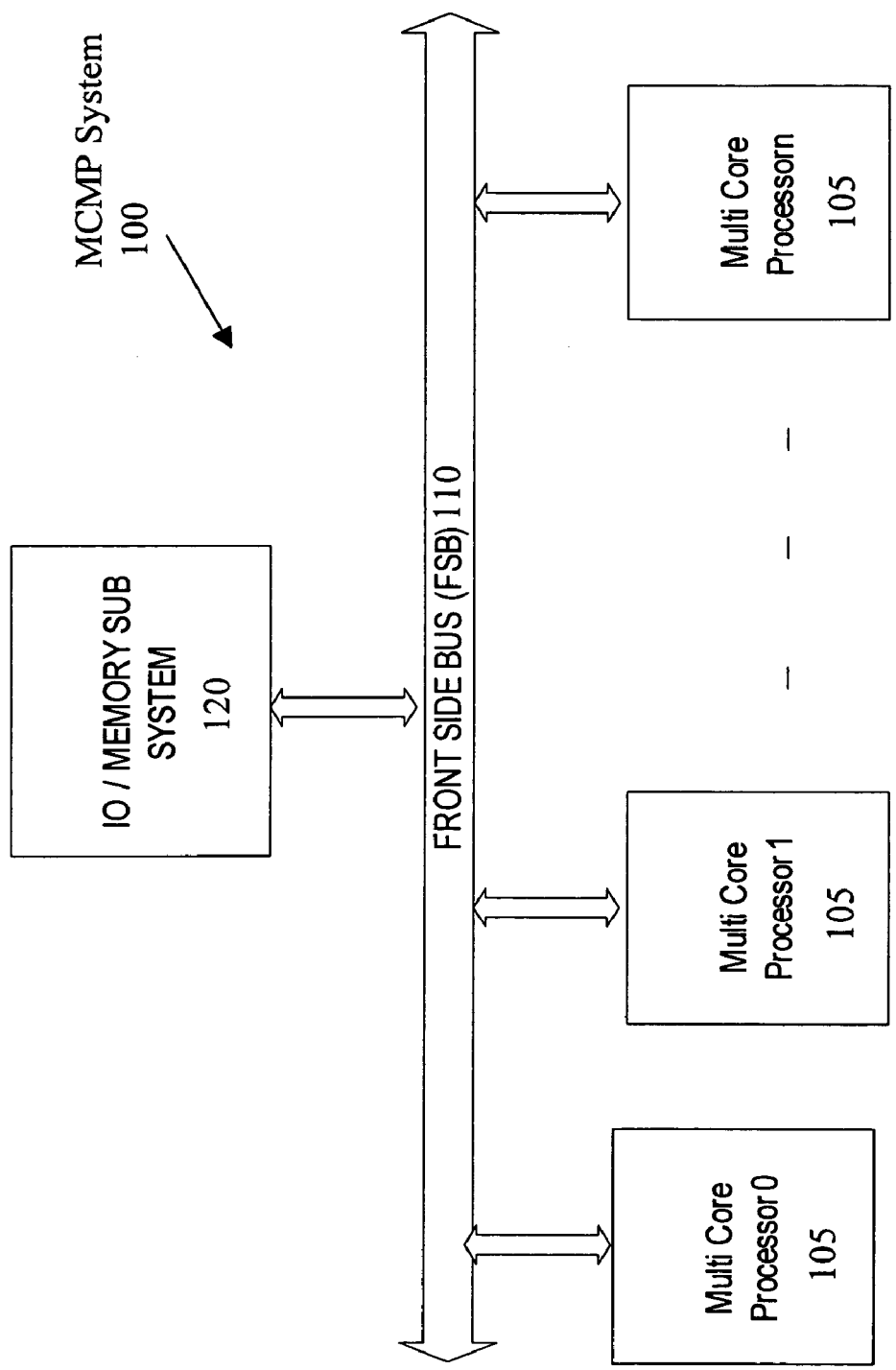
FIG. 1 is a block diagram of a MCMP system based on a FSB.
Figure 2:
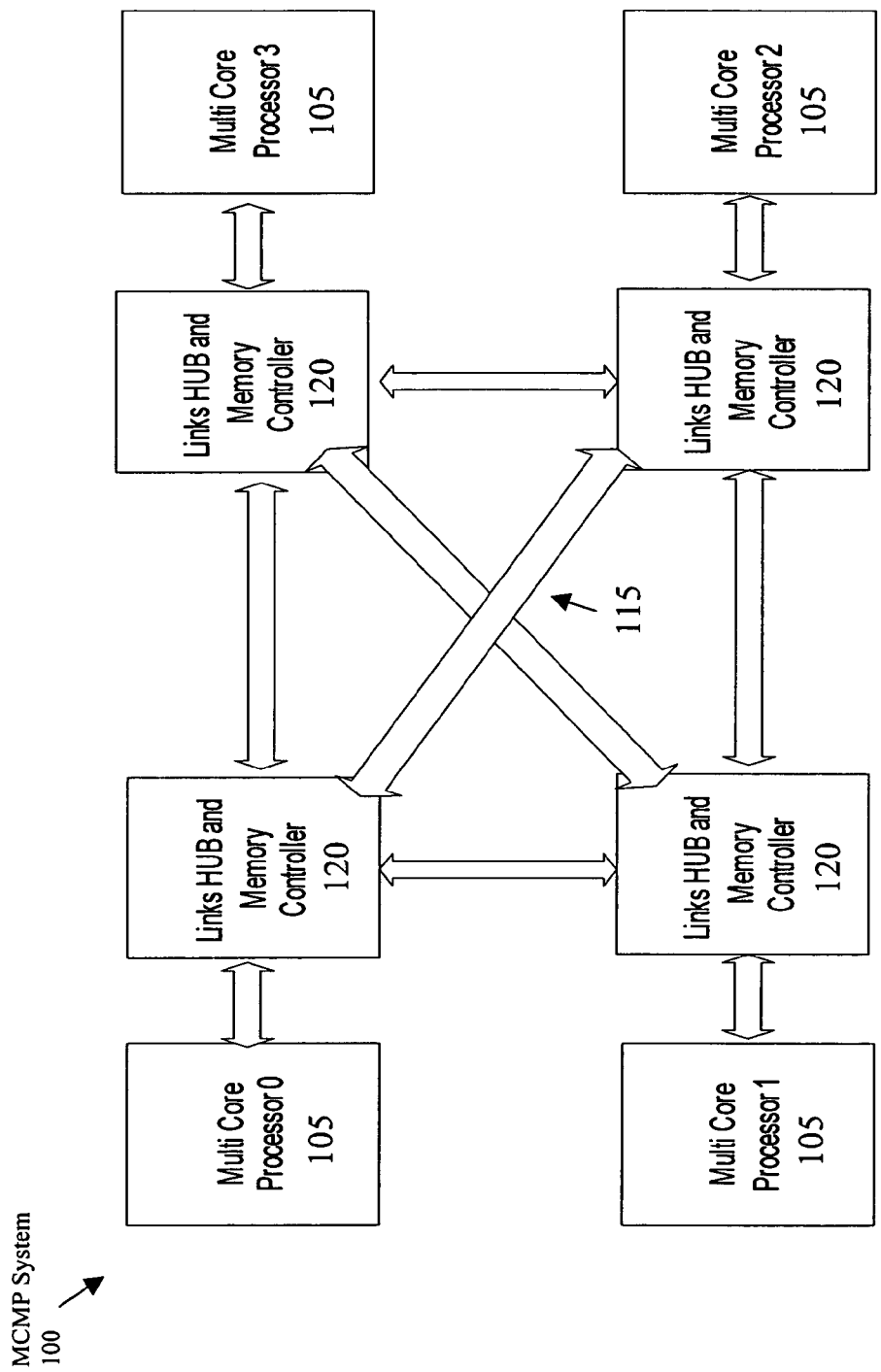
FIG. 2 is a block diagram of a MCMP system based on point to point links.

FIGS. 1 and 2 illustrate a multiprocessor system having a front side bus (FSB) and a point-to-point interconnect, respectively. Business applications, such as transaction processing, require multiprocessor systems which may execute large number of relatively independent threads. FIGS. 1 and 2 illustrate processors 105 in a MCMP system 100 connected to each other using a system interconnect. The system interconnect may be either a front side bus (FSB) 110, as shown in FIG. 1, or links based interconnect 115, as shown in FIG. 2, which supports point to point connections between the processors 105. Depending on the type of system interconnect 110, 115 used, processors 105 may use either a "bus based cache coherence" or a "directory based cache coherence" protocol to maintain cache coherence in the system 100. Each of the processors 105 are connected to memory 120 through the system interconnects.

Due to the presence of large number of executing threads in the MCMP system 100, the snooping traffic on the system bus is quite large when compared to a single processor system. The snoop traffic increases bandwidth pressure on the internal caches and slows down the execution threads in each of the processor cores 105. Therefore reducing the overall performance of the system 100.

In both these configurations, a processor 105 which issues a transaction to the system 100 may determine when ownership transfer has occurred for a cache line. This point is referred to as the point of "global observation", otherwise known as G.O point. At the G.O point, the requesting processor may precisely determine the cache coherence state of the requested cache line. In the case of bus based system this corresponds to the snoop phase of the transaction. In the case of a directory based coherence protocol, this condition is indicated by a specific transaction from the home node to the requesting processor.

Figure 3:
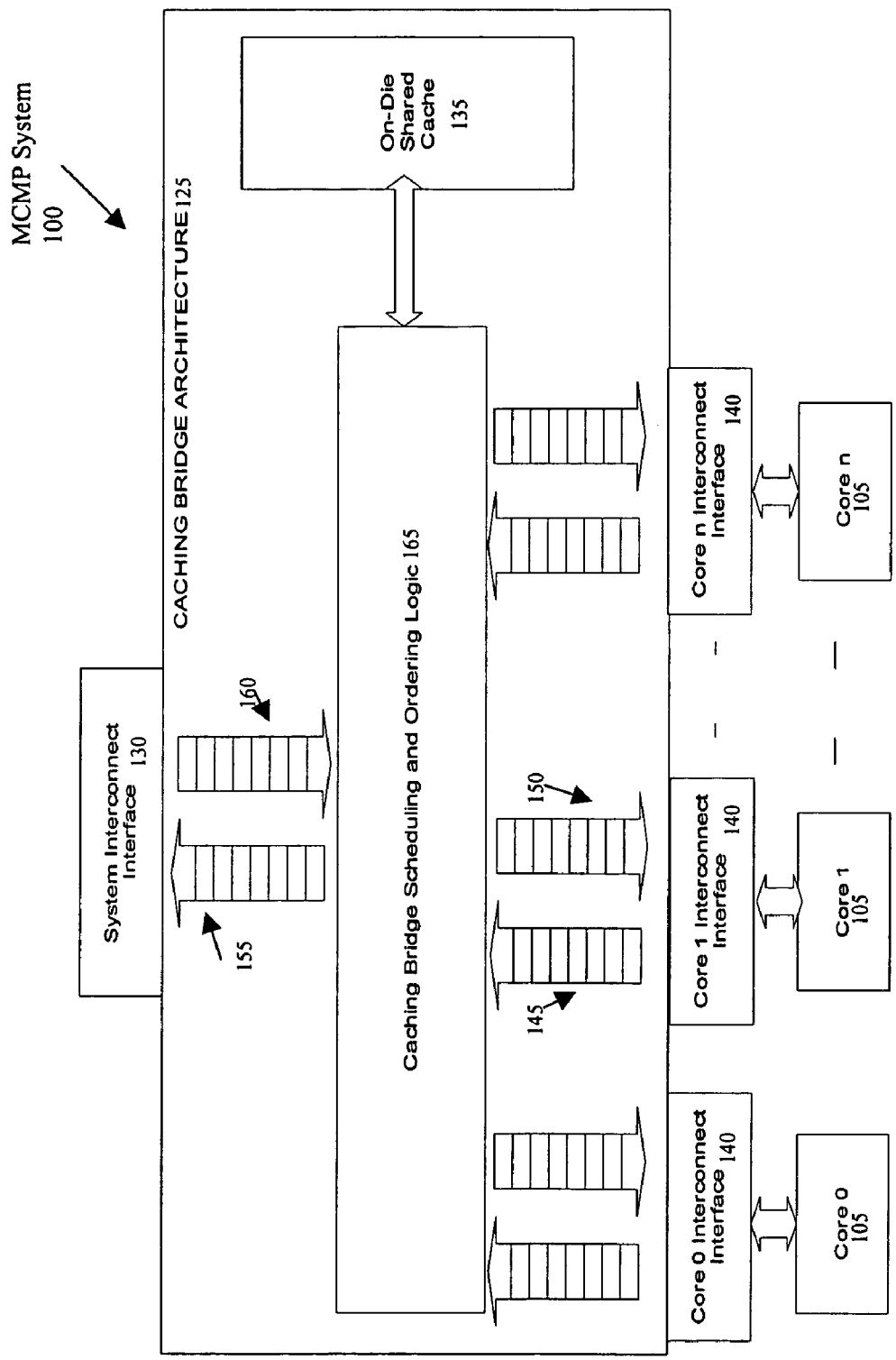
FIG. 3 is a block diagram of a MCMP system with a caching bridge.

FIG. 3 illustrates a MCMP system having a caching bridge. The system 100 includes a caching bridge 125 that bridges the external system 130, the LLC 135 and the cores in the processor 105. Each core in the processors 105 is connected to the bridge 125 through the interconnect interfaces 140 on the bridge 125.

In the MCMP system 100 the caching bridge 125 is responsible for maintaining the coherency of the cache lines present in the LLC 135. The caching bridge is also responsible for receiving transactions from the cores, looking up the on-die shared cache 135 and forwarding requests to the system interconnect 130 if needed. In addition, the caching bridge 125 schedules the requests from the cores to the shared cache 135 and the external interconnect 130 such that each core receives a fair share of the bridge's 125 resources. The caching bridge 125 also ensures that the snoops received from the system interconnect 130 are sent to the appropriate cores in the processors 105 and eventually deliver the correct snoop results and data to the requesting processor.

The bridge 125 may contain one input and one output queue 145, 150 for requests originating from each core. There is also one input and one output queue 155, 160 for the requests that are sent to and received from the system interconnects 130.

The system utilizes the snoop filtering behavior of the shared cache 135 to achieve maximum transaction rate while preserving global ordering. Global ordering in the MCMP system 100 processes ordering at a transaction level and is independent of the underlying physical, link and transport layers used to communicate the transactions.

Figure 4:
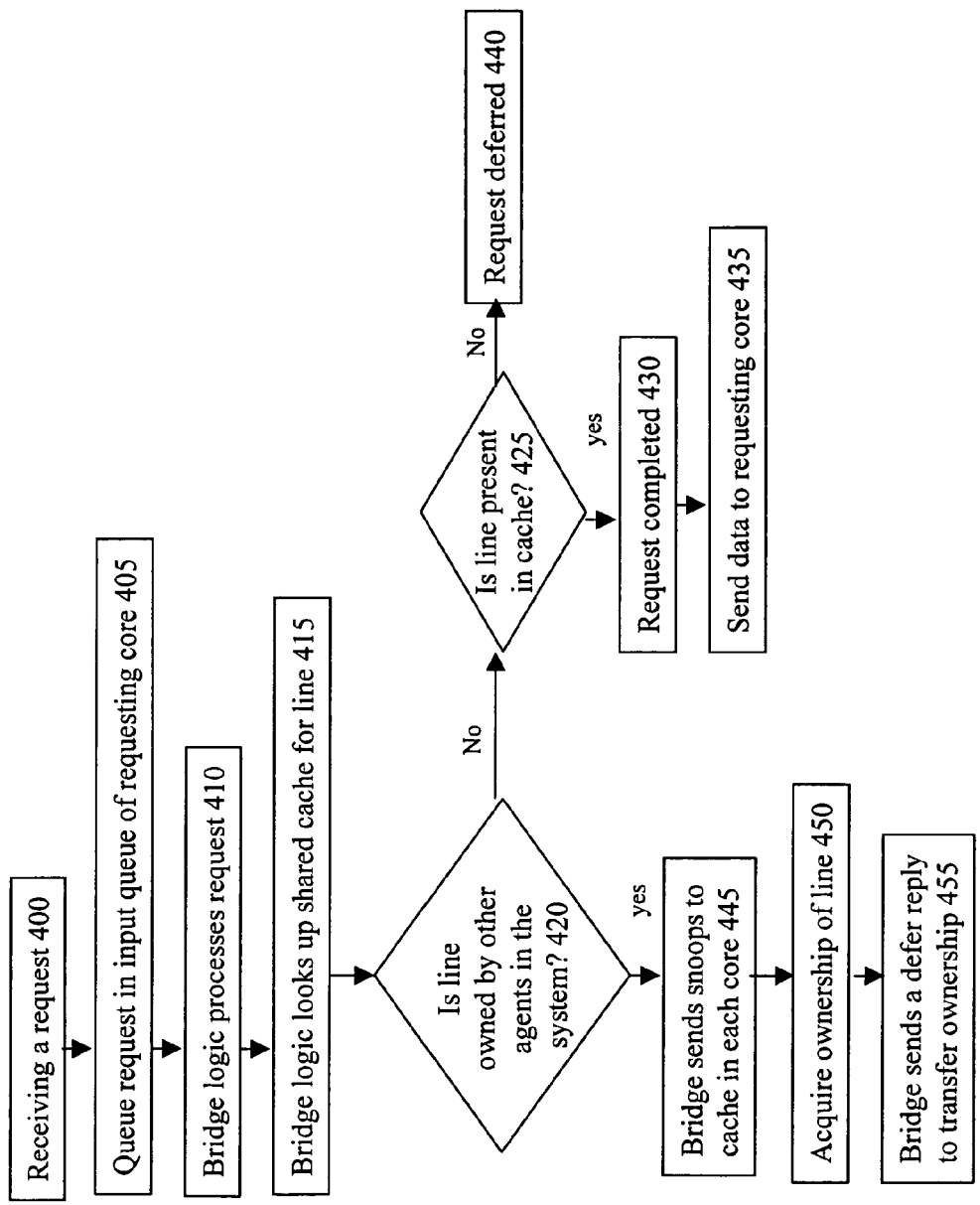
FIG. 4 is a flowchart of one example method of a request being received by the caching bridge of FIG. 3

FIG. 4 illustrates one method of when a request is received by the caching bridge of FIG. 3. Upon the bridge 125 receiving a request 400, the request is queued in the input queue 145 for the core which is making the request 405. The scheduling logic 165 in the bridge 125 may eventually process the request from the input queue 410 and lookup the shared cache for the line 415. Depending on the coherence state of the line in the shared cache at least two actions may be possible. If the line is not owned by any other agent in the system 420 and if the line is present in the cache 425, the request is completed 430 immediately by updating the state of the line and sending the data to the requesting core 435. Otherwise the request is deferred to the requesting agent's interface 440.

In this context deferred may mean the request is injected into the rest of the system to complete the requested action, and the requesting agent may issue other transactions in its queue, but the completion is indicated at a later time. No particular order of completion is guaranteed at the time of "deferring". At any time more than one transaction from a core could be in deferred state.

If the cache line is owned by other cores in the same processor the caching bridge 125 may send snoops to the caches in each core 445 and acquire ownership of the line 450. Now the caching bridge 125 may send a "defer reply" to the requesting core thus transferring the ownership of the line to it 455. Otherwise, if the request line is owned by other processors in the system, a request is sent on the system interconnect. This request itself may be "deferred" or complete depending on the state of the other processors in the system. Eventually the ownership of this line may be transferred to the requesting processor. Now a defer reply is sent to the requesting core thus completing the transaction.

Figure 5:
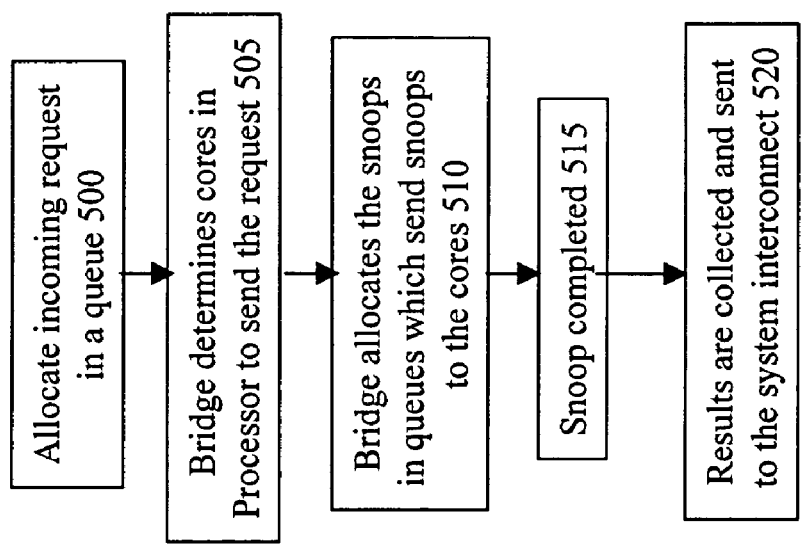
FIG. 5 is a flowchart of one example method of incoming snoops to the caching bridge of FIG. 3.

FIG. 5 illustrates incoming snoops in the system of FIG. 3. Incoming snoops, meaning requests from other processors, in the system 100 also follow a set of actions. Incoming requests are allocated in a queue 500 which may eventually issue the transaction to lookup the shared cache. Based on the coherence state of the line in the cache the bridge may determine the cores in the processor to which the snoop requests need to be sent 505. The caching bridge 125 may allocate these snoops in the queues which send snoops to the cores 510. Once the snoops are completed 515, the results are collected and the coherence line and possibly data are passed back to the system interconnect 520.

Program correctness imposes some strict ordering requirements on the transaction ordering observed by the cores in relation to the transaction ordering observed on the system interconnect. In particular, snooping transactions on the system interconnect, processor requests, and processor request completions may trigger corresponding snooping transactions and request completions to the cores. The order in which the transactions are observed on the system interconnect may impose the order in which the transaction triggered to the core are generated. Since this ordering is between multiple interfaces this is referred to as "global ordering".

Figure 6:
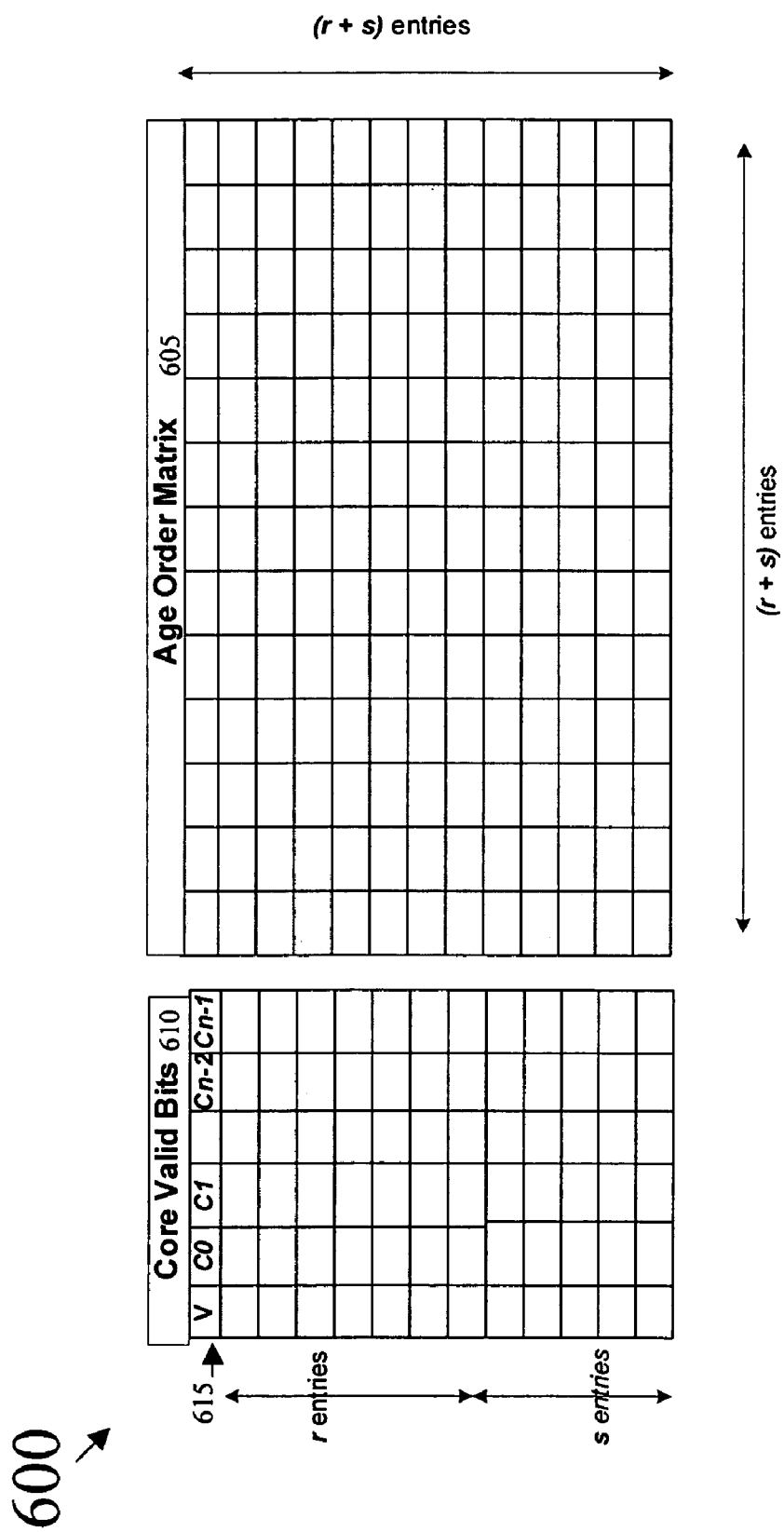
FIG. 6 illustrates a global ordering queue.

FIG. 6 illustrates a global ordering queue. Snooping transactions, processor requests and request completions make an entry into the global ordering queue structure 600. The queue 600 includes an age order matrix (AOM) 605 and core valid bits 610 for each valid entry in the queue. s denotes the maximum number of snooping transactions that may be accommodated by the caching bridge 125. This is the size of the snoop queue in the caching bridge. Also, r denotes the maximum number of requests that may be accepted in the outgoing queue of the caching bridge. This is the size of the system interconnect request queue. n denotes the number of cores in the processor. Therefore, the queue 600 may require $(r+s)*(n+1)$ bits for the core valid bits 610 and $(r+s)*(r+s)$ bits for the age order matrix 605.

For ease of implementation the queue 600 is statically divided between snooping transactions and outgoing requests. Each entry in the snoop queue and the request queue has a corresponding entry in the global ordering queue. For each valid entry, the core bits row indicates the cores to which the entry is either sending snoops or sending request completions. The age vector row indicates all the other entries which are ahead (allocated before) of this entry. Entries are allocated in the order in which they appear on the system bus, the relative order of these allocations is maintained in the age order matrix. Using this global ordering queue 600, the system may compute the oldest entry which may issue a snoop/request completion for each core. This ensures that the order in which snoop/request completions are issued to the cores, is the same as the order in which transaction appears on the system interconnect 130. For each core, the oldest entry which may be issued to it is determined using following implementation.

Snooping transactions for the corresponding entry, initially when a snoop is observed on the system interconnect 130, the core valid bits 610 are all initialized to ones. The valid bit column 615 is copied to the age order row in the AOM 605 and the valid bit is set.

Secondly, on looking up the shared cache 135, if the cache is fully exclusive, no update is required. If the cache 135 is fully inclusive and the line is present in the cache, the core valid bits 610 are updated based on the core which contains the line. However, if the cache is fully inclusive and the line is not present in the cache, then the snoop is complete and the entries valid bit is reset.

Third, upon issuing the snoop to the core interface, for each core to which the snoop is issued, resetting the corresponding bit in the core valid bits 610. Finally, if all the bits are zero in the core valid bit 610, de-allocate the entry by resetting the valid bit 615.

Requesting transactions for the corresponding entry, initially, on allocation when the request/request completion is observed on the system interconnect 130, the core bits for the core from which the request was received are set. Next, the valid bit column 615 is copied into the age order row and the valid bit is set.

Secondly, if the request is deferred on the system interconnect, the entry is de-allocated since there is no ordering to be enforced. Finally, when the request completion for this entry is issued to the core interface, the entry is de-allocated by resetting the valid bit.

Figure 7:
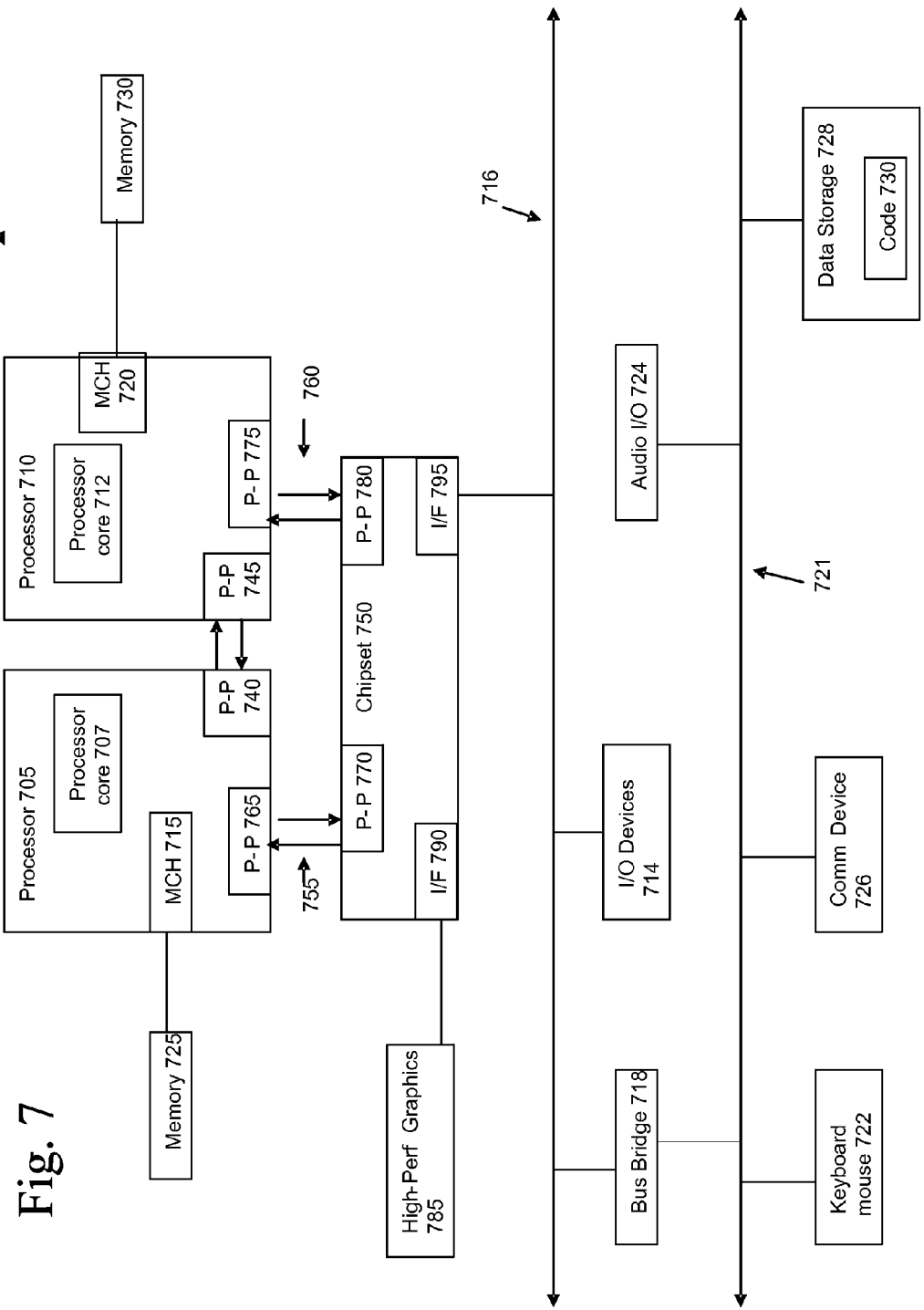
FIG. 7 is a block diagram of an alternative system that may provide an environment for multithreaded processors supporting a save and restore of registers, according to one embodiment.

Referring now to FIG. 7, the system 700 includes processors supporting a lazy save and restore of registers. The system 700 generally shows a system where processors, memory, and input/output devices are interconnected by a number of point-to-point interfaces. The system 700 may also include several processors, of which only two, processors 705, 710 are shown for clarity. Each processor 705, 710 may each include a processor core 707, 712, respectively. Processors 705, 710 may each include a local memory controller hub (MCH) 715, 716 to connect with memory 725, 730. Processors 705, 710 may exchange data via a point-to-point interface 735 using point-to-point interface circuits 740, 745. Processors 705, 710 may each exchange data with a chipset 750 via individual point-to-point interfaces 755, 760 using point to point interface circuits 765, 770, 775, 780. Chipset 750 may also exchange data with a high-performance graphics circuit 785 via a high-performance graphics interface 790.

The chipset 750 may exchange data with a bus 716 via a bus interface 795. In either system, there may be various input/output I/O devices 714 on the bus 716, including in some embodiments low performance graphics controllers, video controllers, and networking controllers. Another bus bridge 718 may in some embodiments be used to permit data exchanges between bus 716 and bus 721. Bus 721 may in some embodiments be a small computer system interface (SCSI) bus, an integrated drive electronics (IDE) bus, or a universal serial bus (USB) bus. Additional I/O devices may be connected with bus 721. These may include keyboard and cursor control devices 722, including mouse, audio I/O 724, communications devices 726, including modems and network interfaces, and data storage devices 728. Software code 730 may be stored on data storage device 728. In some embodiments, data storage device 728 may be a fixed magnetic disk, a floppy disk drive, an optical disk drive, a magneto-optical disk drive, a magnetic tape, or non-volatile memory including flash memory.

Throughout the specification, the term, "instruction" is used generally to refer to instructions, macro-instructions, instruction bundles or any of a number of other mechanisms used to encode processor operations.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method for processing a request received by a bridge, comprising:
   receiving a request from a requesting core of a plurality of cores in a processor;
   selecting the request for further processing based on a selection algorithm;
   determining if a line to be stored in a shared memory, which is associated with the request, is owned by a non-requesting core of the plurality of cores; and
   sending a defer reply from a bridge to the requesting core to transfer ownership of the line from the non-requesting core to the requesting core in response to the line being owned by the non-requesting core.

2. The method of claim 1, further comprising determining if other agents in a computer system including the processor own the line.

3. The method of claim 2, further comprising:
   in response to determining other agents do not own the line:
      determining if the line is present in the shared memory;
      sending data from the line to the requesting core in response to the line being present in the shared memory; and
      deferring the request to a system interface of the processor in response to the line not being present in the shared memory.

4. The method of claim 1, wherein determining if other agents in a computer system and determining if the line is present in the shared memory is done before determining if the line is owned by a non-requesting core.

5. The method of claim 4, further comprising sending a snoop to a cache in the non-requesting core.

6. The method of claim 5, wherein the selection algorithm is based on an age order matrix stored in the bridge, the age order matrix including an entry associated with the request.

7. A method comprising processing incoming snoops to a bridge, comprising allocating an incoming snoop request in a first queue of a processor, the incoming snoop request being from an external agent;
determining a core of a plurality of cores in the processor to send the snoop request;
allocating the snoop request in a second queue associated with the core; and
passing data based on the snoop request to a system interconnect.

8. The method of claim 7 wherein said allocating comprises:
   initializing all agent valid bits to one in a global ordering queue; and
   copying valid bits to an age matrix.

9. The method of claim 8 wherein said copying comprises setting the valid bit.

10. The method of claim 8 wherein deallocating a request by resetting the valid bit if all the bits are set to zero.

11. The method of claim 7, wherein determining a core in the processor to send the snoop request is based on coherency information of a line of a memory in the processor referenced by the snoop request.

12. A processor comprising:
   a caching bridge, wherein the caching bridge comprises a global ordering queue to hold an age order matrix and a core valid bit vector;
   a system interconnect coupled to the caching bridge; and
   one or more cores coupled to the caching bridge, wherein said global ordering queue enforces ordering for requests to and from the system interconnect to the one or more cores based at least on the age order matrix and the core valid bit vector.

13. The processor of claim 12 wherein the global ordering queue is to hold a core valid bit vector for each valid request in the queue.

14. The processor of claim 13 further comprising a snoop queue and a request queue, wherein an entry in the snoop queue and the request queue has a corresponding entry in the global ordering queue.

15. The processor of claim 14 wherein the core vector comprises a valid entry indicates the one or more cores to which the entry is sending snoop request or sending request completion.

16. The processor of claim 15 wherein the age matrix indicates all other entries allocated prior to the requested entry.

17. The processor of claim 16 wherein the entries are allocated in the age matrix in order in which they are received.

18. The processor of claim 17 wherein the global ordering queue computes oldest entry which may snoop or request complete to the one or more cores.

19. A multicore multiprocessor system comprising:
   a first processor comprising:
      a caching bridge, wherein the caching bridge comprises a global ordering queue to hold an age order matrix and a core valid bit vector,
      a system interconnect coupled to the caching bridge, and
      one or more cores coupled to the caching bridge, wherein said global ordering queue enforces ordering for requests to and from the system interconnect to the one or more cores based at least on the age order matrix and the core valid bit vector;
   a first interface coupled to a second processor; and
   a second interface coupled to an input/output device.

20. The processor of claim 19 wherein the global ordering queue is to hold a core valid bit vector for each valid request in the queue.

21. The processor of claim 20 further comprising a snoop queue and a request queue, wherein an entry in the snoop queue and the request queue has a corresponding entry in the global ordering queue.

22. The processor of claim 21 wherein the core vector comprises a valid entry indicates the one or more cores to which the entry is sending snoop request or sending request completion.

23. The processor of claim 22 wherein the age matrix indicates all other entries allocated prior to the requested entry.

24. The processor of claim 23 wherein the entries are allocated in the age matrix in order in which they are received.

25. The processor of claim 24 wherein the global ordering queue computes oldest entry which may snoop or request complete to the one or more cores.

* * * * *